(12) United States Patent
Andou

(10) Patent No.: US 6,294,006 B1
(45) Date of Patent: Sep. 25, 2001

(54) ANTICORROSIVE AND ANTIFOULING ADDITIVE FOR PAINTS AND PAINT CONTAINING THE SAME

(75) Inventor: Hiroshi Andou, Fukuoka (JP)

(73) Assignee: Nazca Co., Ltd., Fukuoka (JP)

( * ) Notice: Subject to any disclaimer, the term of this patent is extended or adjusted under 35 U.S.C. 154(b) by 21 days.

(21) Appl. No.: 09/685,854

(22) Filed: Oct. 11, 2000

(30) Foreign Application Priority Data

Aug. 31, 2000 (JP) .................................................. 12-263102

(51) Int. Cl.⁷ .............................. C09D 5/16; A01N 59/00
(52) U.S. Cl. ..................................... 106/14.05; 106/14.39; 106/15.05; 106/18.3; 106/18.31; 106/286.1; 106/286.2; 106/286.3; 106/286.4; 106/286.5; 106/286.6; 106/286.7; 424/601; 424/602; 424/646; 424/655; 424/657; 424/617
(58) Field of Search .............................. 106/14.05, 14.39, 106/15.05, 18.3, 18.31, 286.1, 286.2, 286.3, 286.4, 286.5, 286.6, 286.7; 424/601, 602, 646, 655, 657, 617

(56) References Cited

U.S. PATENT DOCUMENTS 6,001,157  12/1999  Nogami ............................... 106/18.3

OTHER PUBLICATIONS

Chemical Abstract No. 88–138066 which is an abstract of Japanese Patent Specification No. 52–136231 (Nov. 1977).*
Chemical Abstract No. 117:235881 which is an abstract of Japanese Patent Specification No. 04–141292 (May 1992).*
Chemical Abstract No. 118:236015 which is an abstract of Japanese Patent Specification No. 04–325571 (Nov. 1992).*
Chemical Abstract No. 119:252215 which is an abstract of Japanese Patent Specification No. 05–070716 (Mar. 1993).*
Chemical Abstract No. 129:246254 which is an abstract of Japanese Patent Specification No. 10–237918 (Sep. 1998).*
WPIDS Abstract No. 96–439751 which is an abstract of Japanese Patent Specification No. 08–218004 (Aug. 1996).*

* cited by examiner

Primary Examiner—Anthony Green
(74) Attorney, Agent, or Firm—Arent Fox Kintner Plotkin & Kahn, PLLC

(57) ABSTRACT

An anticorrosive and antifouling additive for paints, which is effective to protect structures such as steel ships and pipes from rust, and prevent the adhesion of marine organisms and algae to the structures used in seawater without adversely affecting the marine environment, and a paint containing the same additive are provided. The additive comprises 70 to 94% by weight of at least one selected from the group consisting of bastnasite, monazite and Chinese complex mineral, 3% by weight or more of tourmaline, and 3% by weight or more of zircon, with respect to the total amount of the additive. The additive emits a required amount of negative ions to achieve the effect of preventing the adhesion of marine organisms and algae and prevents the occurrence of rust. In practical use, the additive can be added to a conventional paint in an amount of 8 to 15% with respect to paint weight.

5 Claims, No Drawings

ANTICORROSIVE AND ANTIFOULING ADDITIVE FOR PAINTS AND PAINT CONTAINING THE SAME

BACKGROUND OF THE INVENTION

1. Field of the Invention

The present invention relates to an anticorrosive and antifouling additive for paints, which is effective to protect structures made of steels or ferrous materials such as steel ships and pipes from rust, and prevent the adhesion of organisms and algae to the structures used in the presence of seawater or fresh water, and also a paint containing the same additive.

2. Disclosure of the Prior Art

In the past, antifouling paints have been used to prevent the adhesion of organisms such as barnacles, seashells, marine algae or the like to ships and structures used in the presence of seawater or fresh water. In general, it is believed that macro fouling or bio-film that is called slime such as bacteria, floating organic substances and diatom is firstly formed on the ship bottom, and then the adhesion of various kinds of marine organisms occurs. Currently, the following antifouling paints (1) to (3) are mainly used to prevent the adhesion of marine organisms.

(1) Hydrolysis Type Paint (Self-Abrasion Type Paint)

This paint is known as a kind of dissoluble matrix type paint. When an applied film of this paint comes into contact with seawater having a pH value of 8.0 to 8.2 that is slightly alkaline, hydrolysis proceeds at a constant speed, so that a resin of the surface dissolves, and a new surface of the applied film appears. A sterilizing force of copper ions eluted from the surface of this applied film prevents the adhesion of marine organisms. In brief, the applied film having a multilayer structure of the paint containing an antifouling agent is formed on the ship bottom, and the layers of the applied film peel off on a one-by-one basis in seawater to prevent the adhesion of marine organisms.

(2) Hydration-Dissolution Type Paint (Hydration-Decomposition Type Paint, Hydration-Decay Type Paint)

This paint is a kind of dissoluble matrix type paint as well as the hydrolysis type paint described above, and is characterized by comprising a polymer, copper suboxide and a rosin extracted from pines as the main components. The rosin is a natural oligomer composed of abietic acid having a molecular weight of about 300 and an isomer thereof. Affinity for seawater and the slight dissolubility thereto of the rosin are known for a long time. When an applied film of this paint comes into contact with seawater, a surface portion of the applied film slightly dissolves due to the dissolubility of rosin, and agents such as copper suboxide appear on the applied film. In brief, since the surface of this applied film is normally slimy, the adhesion of marine organisms can be prevented by synergistic effects of the above agents and the surface condition that the marine organisms are difficult to adhere.

(3) Extraction Type Paint

This paint is known as a kind of indissoluble matrix type paint, which comprises copper suboxide, rosin and a hydrophobic synthetic resin as the main components. Although this paint itself is not dissolved, only an antifouling agent included therein elutes from the matrix into seawater. In comparison with the dissoluble matrix type paint described above, it is characterized in that a larger amount of the agents is included in the paint, and the applied film has an increased hardness.

Thus, most of the ship bottom paints utilize the sterilizing force of copper ions. When some conditions such as seawater temperature, marine environment and cruising conditions of ships are satisfied, the effect of preventing the adhesion of marine organisms can be achieved to some extent. However, it is desired to further improve the effect of preventing the adhesion of marine organisms such as barnacles, seashells, marine algae or the like.

The ships of steels or ferrous materials also need to be painted two to four times with anticorrosive paints to prevent the occurrence of rust when the ship bottom comes into contact with seawater for a long time period. Most of the anticorrosive paints of the past usually contain organic tin polymer compounds to prevent the adhesion of marine organisms. Since the organic tin polymer compounds are materials having high bioactivity, they have detrimental effects on another marine organisms other than barnacles, seashells, and marine algae, e.g., the occurrence of deformed fishes. For this reason, the use of the organic tin polymer compounds has been voluntarily restrained since the latter half of the '80s.

In addition, as a consequence of the consultation held at the International Maritime Organization (IMO) headquartered in London from Jun. 28 to Jul. 2, 1999, agreements of prohibiting the use of the organic tin polymer compounds for the ship bottom paints by the year 2003 and the use of them in all aspects by the year 2008 were made. However, at present, since there is no paint or additive for effectively preventing the adhesion of marine organisms, which takes the place of the paints containing the organic tin polymer compounds, the development of such paint and/or additive is urgently necessary.

From the above reasons, paint makers of most of the industrialized countries have stopped the use of the organic tin polymer compounds. Under present circumstances, since the adhesion of marine organisms can not be sufficiently prevented, there is a problem that the frequency of cleaning the marine organisms adhered on the ship bottom increases, and the cost of the cleaning operation rises.

The adhesion of marine organisms wields a very large influence over ship service. In usual painting operation for the ship bottom, an anticorrosive treatment (primer treatment) is performed several times to the metal portions, and then a ship bottom paint is applied. It is said that the load on the engine increases with increase in thickness of the applied layer. For example, when only 5 $\mu$m increases in thickness of the applied layer, about 1 knot drops in speed of the ship. In this case, when barnacles or seashells attach the ship bottom, the resistance to seawater further increases, so that 3 to 5 knots drop in speed of the ship.

Thus, since the fuel efficiency of the ship becomes poor, it is necessary to perform the cleaning operation of the adhered marine organisms and then the repainting operation every 3 months or every 6 months, with respect to small fishing boats. Consequently, much effort and cost are expended on the regular maintenance of the fishing boats. On the other hand, with respect to large ships such as tankers, there is a problem that a breakage of camshaft is caused when large amounts of the barnacles or seashells adhere under a marine environment, and the load on the engine excessively increases.

On the other hand, in plants using seawater to cool the driving system, there is another problem that the intake amount decreases due to the adhesion of marine organisms to piping, so that seizing up of the driving system is caused by a reduction in cooling efficiency.

SUMMARY OF THE INVENTION

In view of the above problems, a primary object of the present invention is to provide an anticorrosive and antifouling additive for paints, which is effective to protect structures such as steel ships and pipes used in the presence of seawater or fresh water from rust, and prevent the adherence of marine organisms such as barnacles, seashells, marine algae or the like to the structures without deleterious effects on the marine environment. That is, the anticorrosive and antifouling additive is characterized by comprising:

(A) 70 to 94% by weight, with respect to a total amount of the additive, of at least one selected from the group consisting of bastnasite, monazite and Chinese complex mineral;
(B) 3% by weight or more of tourmaline with respect to the total amount of the additive; and
(C) 3% by weight or more of zircon with respect to the total amount of the additive.

It is preferred that an average particle size of the additive is within a range of 1 to 10 $\mu$m. In particular, it is preferred that the anticorrosive and antifouling additive substantially consists of (A) 90% by weight of at least one selected from the group consisting of bastnasite, monazite and Chinese complex mineral, (B) 5% by weight of tourmaline and (C) 5% by weight of zircon.

A further object of the present invention is to provide a paint containing the additive described above. It is particularly preferred that an amount of the additive is within a range of 8 to 15% with respect to paint weight.

DETAILED DESCRIPTION OF THE INVENTION

The anticorrosive and antifouling additive for paints and the paint containing the same additive of the present invention are explained below in detail.

As a result of eagerly performing consideration and experiments to achieve the purpose described above, it is found in the present invention that when the additive comprises (A) 70 to 94% by weight, with respect to a total amount of the additive, of at least one selected from the group consisting of bastnasite, monazite and Chinese complex mineral, (B) 3% by weight or more, i.e., 3 to 27% by weight of tourmaline with respect to the total amount of the additive, and (C) 3% by weight or more, i.e., 3 to 27% by weight of zircon with respect to the total amount of the additive, improved effects of preventing the occurrence of rust and the adhesion of marine organisms can be simultaneously achieved.

The additive of the present invention normally emits negative ions. The negative ions provide mutually contradictory effects of enhancing and preventing the adhesion of marine organisms according to an amount of the emission of negative ions. In the past, a sufficient level of satisfaction is not achieved irrespective of many attempts because of inadequate understanding of the relationship between the amount of the emission of negative ions and the mutually contradictory effects. In the present invention, the amount of the emission of negative ions suitable for preventing the adhesion of marine organisms is ascertained. In addition, an amount of zircon suitable for preventing the occurrence of rust is ascertained. Therefore, both of the anticorrosive and antifouling effects are obtained by the additive of the present invention. When the above-defined composition ranges are not satisfied, the purpose of the present invention can not be sufficiently achieved. In particular, a decrease in the amount of the emission of negative ions brings about the reverse effect of enhancing the adhesion of marine organisms.

In addition, it is preferred that the additive of the present invention comprises (A) 80 to 94% by weight of at least one selected from the group consisting of bastnasite, monazite and Chinese complex mineral, (B) 3 to 10% by weight of tourmaline and (C) 3 to 10% by weight of zircon, with respect to the total amount of the additive. In this case, it is possible to provide the anticorrosive and antifouling effects with reliability irrespective of variations in marine environment. Moreover, as a particularly preferred example of the additive of the present invention, it is possible to recommend using the anticorrosive and antifouling additive that substantially consists of (A) 90% by weight of bastnasite, (B) 5% by weight of tourmaline and (C) 5% by weight of zircon.

Each of monazite and bastnasite is a kind of cerium, lanthanum phosphate mineral that normally emits negative ions. For example, as bastnasite, on the conversion that the total amount of rare-earth components in bastnasite is 100%, it is possible to use a bastnasite powder having the rare-earth compositions of $CeO_2$ (49.00%), $La_2O_3$ (32.00%), $Nd_2O_3$ (13.50%), $Pr_6O_{11}$ (4.40%), $Sm_2O_3$ (0.50%), $Eu_2O_3$ (0.10%), $Gd_2O_3$ (0.30%), $Y_2O_3$ (0.10%), $Tb_2O_3$ (0.01%), $Dy_2O_3$ (0.03%), $Ho_2O_3$ (0.01%), $Er_2O_3$ (0.01%), $Tm_2O_3$ (0.02%), $Yb_2O_3$ (0.01%) and $Lu_2O_3$ (0.01%).

On the other hand, as monazite, on the conversion that the total amount of rare-earth components in monazite is 100%, it is possible to use a monazite powder having the rare-earth compositions of $CeO_2$ (43.73%), $La_2O_3$ (17.47%), $Nd_2O_3$ (17.47%), $Pr_6O_{11}$ (4.98%), $Sm_2O_3$ (4.87%), $Eu_2O_3$ (0.16%), $Gd_2O_3$ (6.56%), $Y_2O_3$ (3.18%), $Tb_2O_3$ (0.26%), $D_{y2}O_3$ (0.90%), $Ho_2O_3$ (0.11%), $Er_2O_3$ (0.04%), $Tm_2O_3$ (0.03%), $Yb_2O_3$ (0.21%) and $Lu_2O_3$ (0.03%).

Chinese complex mineral is a mixture of monazite and bastnasite, which is mainly found at Bayan Obo, Inner Mongolia, China. For example, on the conversion that the total amount of rare-earth components in Chinese complex mineral is 100%, it is possible to use a Chinese complex mineral powder having the rare-earth compositions of $CeO_2$ (52.2%), $La_2O_3$(25.9%), $Nd_2O_3$(16.3%), $Pr_6O_{11}$(5.4%), and $Sm_2O_3$, $Eu_2O_3$, $Gd_2O_3$, $Y_2O_3$ and so on (0.2%).

The compositions of bastnasite, monazite and Chinese complex mineral slightly change according to the location of ore deposits. Therefore, bastnasite, monazite and Chinese complex mineral used in the present invention are not limited to the above-described compositions.

Zircon is a silicate mineral of zirconium that is mainly found in Australia. Zirconium (Zr) is one of titanium group elements. The atomic number and atomic weight of zirconium are 40 and 91, 22, respectively. As the crystalline structure of zirconium, there are hexagonal ($\alpha$) and cubic ($\beta$) structures. Zircon belongs to the tetragonal structure, and is a crystalline substance of transparency, semi-transparency, brown or yellowish transparency. As described above, a main purpose of using zircon in the additive of the present invention is to provide the anticorrosive effect.

Tourmaline is a cyclosilicate mineral that is included in a metamorphic rock or pegmatite mainly found in Brazil, India, China and Africa. Tourmaline comprises three types of Elbaite, Dravite and Schorl. In the present invention, it is particularly preferred to use Schorl. Tourmaline is of a hexagonal crystalline structure. A typical chemical composition of tourmaline is represented by $NaFe_{2+3}Al_6(BO)_3Si_6O_{18}(OH)_4$.

Tourmaline has a property that is called the piezoelectric effect, and permanently provides the flow of electrons. Positive and negative poles voluntarily appear on both ends of tourmaline crystal. Electrons (adsorptive activity) stored in the negative pole are discharged at the instant of contacting water, so that water molecule dissociates into $H^+.OH^-$ (repulsion activity). $H^+$ ions of the positive ions are attracted by the negative pole of the tourmaline crystal, and then bonded/neutralized with emitted electrons to form hydrogen atoms. The hydrogen atoms are released into the atmosphere. On the other hand, the $OH^-$ ions of the negative ions are bonded with the surrounding water molecules to form an interfacial active substance of negative ion that is often referred to as hydroxyl ions $H_3O_2$. The hydroxyl ions bring about an interfacial active effect.

The additive of the present invention can be produced by measuring the mass of each of a powder of at least one selected from the group consisting of bastnasite, monazite and Chinese complex mineral, tourmaline powder and a zircon powder so as to satisfy the above-described compounding amounts, and then grinding and uniformly mixing those powders according to conventional methods, e.g., by use of ball mill. It is preferred that an average particle size of the additive is within a range of 1 to 10 $\mu$m, and more preferably 3 to 8 $\mu$m. When a paint containing the additive having the average particle size of more than 10 $\mu$m is painted on the ship bottom, about 1 knot may drop in speed of the ship because of increased resistance to seawater.

In practical use, the anticorrosive and antifouling additive of the present invention can be added to conventional paints such as modified (non-tar) epoxy resin paints, tar epoxy resin paints, and pure epoxy resin paints. It is preferred that an amount of the additive is within a range of 8 to 15% with respect to paint weight. A solution previously prepared by dispersing the additive into a solvent may be added to the paint to be used.

EXAMPLE 1

An anticorrosive and antifouling additive for paints according to Example 1 of the present invention was produced by the following method.

First, a mixture of powders of bastnasite, tourmaline and zircon was prepared such that the additive essentially consists of 90% by weight of bastnasite, 5% by weight of tourmaline and 5% by weight of zircon. Subsequently, the mixture was ground and uniformly mixed to obtain the additive having an average particle size of about 5 $\mu$m. A required amount of this additive was added to a modified (non-tar) epoxy resin paint, and sufficiently stirred to obtain an anticorrosive and antifouling paint of Example 1. The amount of the additive is about 10% by weight with respect to the epoxy resin paint.

As a substrate for testing, an iron plate having the size of 50 cm×50 cm and the thickness of 5 mm was used. A conventional primer treatment was performed on opposite surfaces of the iron plate. The primer treatment was repeated three times to obtain undercoat layers on the both surfaces of the iron plate. Then, the anticorrosive and antifouling paint of Example 1 was applied to each of the undercoat layers to obtain a test piece having an anticorrosive and antifouling layer as the outermost layer. An average amount of the emission of negative ions from the antifouling layer is 11200/cm³.

As Comparative Example 1, an iron plate having the same shape as the above was used, and the primer treatment was repeated three times to obtain a test piece having only the undercoat layers on opposite surfaces thereof. That is, in this case, the anticorrosive and antifouling paint of Example 1 was not applied to the undercoat layers.

After these test pieces of Example 1 and Comparative Example 1 were held at the depth of 3 m from the sea surface for 1 year, the degree of rust and the adhesion of marine organisms to the test piece were observed and evaluated. The results revealed that neither of the occurrence of rust and the adhesion of marine organisms was found on the test piece of Example 1. On the other hand, with respect to the test piece of Comparative Example 1, the occurrence of rust was not found, but sea lettuce adhered to the substantially entire surface of the test piece is and the adhesion of barnacles, seashells or the like were also found.

In addition, the anticorrosive and antifouling paint of Example 1 was painted on the bottom of a steel ship. After using the ship at sea for about one year, the degree of rust and the adhesion of marine organisms to the ship bottom were observed and evaluated. In this case, an average amount of the emission of negative ions from the painting is 11320/cm³. The results revealed that the occurrence of rust and the adhesion of barnacles, seashells or the like were not found except for a small amount of sea lettuce adhered to a part of the ship bottom.

EXAMPLE 2

An anticorrosive and antifouling additive for paints according to Example 2 of the present invention was produced by the following method.

First, a mixture of a mixed powder of bastnasite and monazite (bastnasite:monazite=9:1), tourmaline powder and a zircon powder was prepared such that the additive essentially consists of 70% by weight of the mixed powder, 15% by weight of tourmaline and 15% by weight of zircon. Subsequently, the mixture was ground and uniformly mixed to obtain the additive having an average particle size of about 6 $\mu$m. A required amount of this additive was added to a tar epoxy resin paint, and sufficiently stirred to obtain an anticorrosive and antifouling paint of Example 2. The amount of the additive is about 10% by weight with respect to the epoxy resin paint As a substrate for testing, an iron plate having the size of 50 cm×50 cm and the thickness of 5 mm was used. A conventional primer treatment was performed on opposite surfaces of the iron plate. The primer treatment was repeated three times to obtain undercoat layers on the both surfaces of the iron plate. Then, the anticorrosive and antifouling paint of Example 2 was applied to each of the undercoat layers to obtain a test piece having an anticorrosive and antifouling layer as the outermost layer. An average amount of the emission of negative ions from the antifouling layer is 7850/cm³.

As Comparative Example 2, an iron plate having the same shape as the above was used, and the primer treatment was repeated three times to obtain a test piece having only the undercoat layers on opposite surfaces thereof. That is, in this case, the anticorrosive and antifouling paint of Example 2 was not applied to the undercoat layers.

After these test pieces of Example 2 and Comparative Example 2 were held at the depth of 3 m from the sea surface for 1 year, the degree of rust and the adhesion of marine organisms to the test piece were observed and evaluated. The results revealed neither of the occurrence of rust and the adhesion of marine organisms was found on the test piece of Example 2. On the other hand, with respect to the test piece of Comparative Example 2, the occurrence of rust was not found, but sea lettuce adhered to the substantially entire surface of the test piece and the adhesion of barnacles, seashells or the like were also found.

In addition, the anticorrosive and antifouling paint of Example 1 was painted on the bottom of a steel ship. After using the ship at sea for about one year, the degree of rust and the adhesion of marine organisms to the ship bottom were observed and evaluated. In this case, an average amount of the emission of negative ions from the painting is 8210/cm$^3$. The results revealed that the occurrence of rust and the adhesion of barnacles, seashells or the like were not found except for a small amount of sea lettuce adhered to a part of the ship bottom.

As described above, in the past, paints containing organic tin compounds that have deleterious effects on the marine environment were used to prevent the adhesion of marine organisms to ships and structures used in the sea. However, from the viewpoint of the global environmental protection, since agreements of prohibiting the use of such paints have been made on a worldwide scale, the development of anticorrosive and antifouling paints that take the place of the prior paints, that is, paints having the effect of preventing both of the occurrence of rust and the adhesion of marine organisms without the deleterious effects on the marine environment, is being awaited.

In the present invention, it is found that the anticorrosive and antifouling additive, which is characterized by comprising (A) 70 to 94% by weight, with respect to a total amount of the additive, of at least one selected from the group consisting of bastnasite, monazite and Chinese complex mineral; (B) 3% by weight or more of tourmaline with respect to the total amount of the additive; and (C) 3% by weight or more of zircon with respect to the total amount of the additive, brings a high degree of success in the development of the paint that sufficiently addresses the above needs.

In case of applying a paint containing the additive of the present invention to ships or structures used in the presence of seawater for an extended time period, there are advantages that the adhesion of marine organisms can be remarkably reduced, the fuel efficiency of the ships can be improved, and the effort and cost expended on the regular maintenance of the ships or structures can be decreased by a large amount.

Thus, the anticorrosive and antifouling additive and the paint containing the additive of the present invention meet the needs of the time from the viewpoint of the global environmental protection as well as providing great value in industries such as fishing and marine transportation. Therefore, they are expected as the next-generation additive and paint that take the place of the prior paints containing the organic tin compounds.

What is claimed is:

1. An anticorrosive and antifouling additive for paints comprising:
(A) 70 to 94% by weight, with respect to a total amount of the additive, of at least one selected from the group consisting of bastnasite, monazite and Chinese complex mineral;
(B) 3% by weight or more of tourmaline with respect to the total amount of the additive; and
(C) 3% by weight or more of zircon with respect to the total amount of the additive.

2. The anticorrosive and antifouling additive as set forth in claim 1, wherein an average particle size of the additive is within a range of 1 to 10 μm.

3. The anticorrosive and antifouling additive as set forth in claim 1, substantially consisting of (A) 90% by weight of at least one selected from the group consisting of bastnasite, monazite and Chinese complex mineral, (B) 5% by weight of tourmaline, and (C) 5% by weight of zircon.

4. A paint containing the additive as set forth in claim 1.

5. The paint as set forth in claim 4, wherein an amount of the additive is within a range of 8 to 15% with respect to paint weight.

* * * * *